United States Patent Office 2,900,226
Patented Aug. 18, 1959

2,900,226

RECOVERY OF URANIUM VALUES FROM RESIDUES

Ward B. Schaap, Bloomington, Ind., assignor, by mesne assignments, to the United States of America as represented by the United States Atomic Energy Commission No Drawing. Application May 20, 1952
Serial No. 288,960

13 Claims. (Cl. 23—14.5)

The present invention relates in general to recovery of uranium values from difficultly-soluble residues, and more particularly to an improved method for dissolvably liberating uranium values entrapped in oxide residues which resist repeated leaching with strong acids.

As is known, in certain uranium processing operations, there obtain difficultly-soluble residues—largely, insoluble metal oxides, sulfates, and the like—containing, entrapped therein, uranium values which are desired to be separated and recovered. Commonly, uranium compounds, particularly more or less corrosive compounds such as uranous chloride, upon contacting ordinary processing apparatus, become somewhat contaminated with materials constituting the apparatus. Most often, these contaminants appear in subsequent stages of processing as residues—mainly metal oxides—which deposit from aqueous solutions of the uranium. While such residues normally occur in only rather limited proportion, and are readily removable from solution by filtration or the like, they often contain small but significant quantities of uranium values. It is frequently highly desirable, particularly in sizable operations wherein large quantities of such residues continuously collect, to recover substantially all of the uranium values therefrom. Although conventional application of strong mineral acid leaching will ordinarily recover a part of the uranium content, it has been found that, in general, a point is soon reached where further leaching of the residue with acid removes no more of the uranium therein. From this, it appears that the remaining uranium is mechanically occluded within the refractory residues, thereby rendering further recovery of valuable uranium especially difficult.

This problem is encountered particularly, for example, in processing operations in which uranium tetrachloride vapors, within an evacuated chamber, condense and deposit upon various metal apparatus members, as well as upon porcelain insulators, glass vessels, and the like. Such operations are described in more detail in copending applications: S.N. 532,159, filed April 21, 1944, Patent No. 2,758,000, issued August 7, 1956, in the names of James M. Carter and Martin D. Kamen, for Isotope Enrichment Process; S.N. 532,160, filed April 21, 1944, now abandoned, in the name of Martin D. Kamen, for Process of Recovering Uranium; and S.N. 559,624, in the names of James M. Carter and Clarence E. Larson, filed October 20, 1944, for Process of Recovering Uranium, now Patent No. 2,855,270, issued Ooctober 7, 1958.

In such operations, the condensed uranium is removed from all of the various apparatus parts by washing with hot water accompanied by mild scrubbing. The resulting wash solution may be noted to include some insoluble apparatus-corrosion-product residue, which, together with any particles abraded by the scrubbing, are thereupon removed by filtration. Hydrogen peroxide ordinarily is then added to the filtered wash solution to oxidize the dissolved uranium values to hexavalent oxidation state, in preparation for subsequent uranium processing; here again, some residue ordinarily precipitates from solution, and is removed from solution by filtration. These residues, together with smaller amounts of like residues similarly obtained at later points in the processing, are normally combined, given three short nitric acid leaches to recover the readily-dissolvable portion of their uranium content, and then dried and accumulated for subsequent periodic recovery of substantially all of the remaining uranium content. While such residue is, on the whole, a more or less indiscriminate conglomeration of insoluble inorganic compounds, analytical studies indicate that composition tends largely along the lines of the typical analysis tabulated in Table 1 below.

TABLE 1

*Typical constitution of uranium-bearing residues*

| Element | Percent by Weight | Probable Form |
|---|---|---|
| Si | 10-20 | $SiO_2$. |
| Ca | 10-20 | $CaSO_4$. |
| Sn | 5-10 | $SnO_2$. |
| Fe | 1-5 | $Fe_2O_3$. |
| Cr | 1-5 | $Cr_2O_3$. |
| Al | 1-5 | $Al_2O_3$. |
| Cu | 0.5-3 | CuO. |
| Ag | <1 | AgCl. |
| Other metals | <1 each | (oxides). |
| U | 0.1-1 | |

Similar difficultly-soluble uranium-bearing residues are obtained by various other uranium processing operations, as, for example, in the vapor-phase chlorination of uranium oxides to $UCl_4$ with carbon tetrachloride in ferrous-metal autoclaves, such as is described in copending application: S.N. 737,156, filed March 25, 1947, in the names of John L. Patterson and Alan Bell, for Uranium Chlorination Process, now Patent No. 2,756,124, issued July 24, 1956.

Upon washing the $CCl_4$-free $UCl_4$ from the autoclave, a uranium-bearing residue of contaminating metal oxides frequently deposits from the wash solution.

In attempting the desired substantially-complete recovery of uranium therefrom, such accumulated residue has proven to be strongly resistant to further uranium dissolution. Even most radical dissolution treatment—a series of protracted leachings with hot concentrated mineral acid—will afford removal of only a part of the remaining uranium; beyond this, leaching, no matter how vigorous, has proven distinctly ineffective for the essentially quantitative recovery of the uranium content. It seems clear that the remainder of the uranium is so bound in the refractory residue—through mechanical co-precipitation, through adsorption, or perhaps through precipitation of residue particles around undissolved uranium compounds—that the uranium is retained effectively inaccessible to the acid. In view of the inability of conventional leaching operations to afford complete recovery of such uranium values, it has become highly desirable that improved methods be found for simply and quickly overcoming the present, indefinite-occlusion difficulty, for substantially solubilizing the uranium content of the residues, and for affording substantially quantitative dissolution-recovery of the uranium from such residues.

Accordingly, one object of the present invention is to provide a new and improved method for the liberation, solubilization, and recovery, of uranium values from difficultly-soluble inorganic residues.

Another object is to provide such a method which affords recovery of substantially the entirety of the uranium content of such residues.

Still another object is to provide such a method which is simple and direct, and which is especially effective in rendering uranium values, unleachably occluded in difficultly-soluble inorganic residues, substantially accessible to leaching acids.

A further object is to provide such a method constituting a general procedure of universal applicability for treatment of diverse, indiscriminate, difficultly-soluble inorganic residues for the recovery of uranium values therefrom.

Additional objects will become apparent hereinafter.

In accordance with the present invention, an improved method for the recovery of uranium values from difficultly-soluble inorganic residue containing the same, particularly residue comprised predominantly of metal oxides, comprises subjecting said residue to the actions, in consecutive alternation, of gaseous hydrogen fluoride, and of gaseous hydrogen, thereby dissolvably liberating uranium values therein, and thereafter leaching the resulting residue with a strong mineral acid. It has been empirically discovered that such a series of consecutive alternate treatments with gaseous hydrogen fluoride, and with gaseous hydrogen, is exceptionally effective in readily rendering uranium values contained in said residues virtually completely recoverable by the subsequent strong acid leaching. For example, when applied to such residues as those alluded to in Table 1, supra, it has been found that the application of only two gaseous hydrofluorinations, with a single intermediate hydrogen treatment, followed by aqueous nitric acid leaching, consistently affords recovery of all but so little as 1%, and often much less, of the initial uranium content of the residue, as compared with the most vigorous concentrated nitric acid leachings alone, which regularly leave at least 20% to 50% of the uranium unrecovered. By virtue of such quantitative efficiency, the present process clearly affords significant practical advantages in the recovery of uranium from residues.

For full effectiveness, the vapor phase treatment should be conducted at elevated temperatures and under substantially anhydrous conditions. 500° to 700° C. is the preferred temperature range; hydrogen fluoride treatment is best effected at 600–700° C., while 500–600° C. appears optimum for the hydrogen treatment. The vapor phase treatments may most simply be effected by passing the gases over the heated residue contained in boats disposed in a horizontal tube in a tube furnace. Other conventional gas-solid reaction techniques, for example, tumbling the finely divided residue in a rotating, heated tube, through which the treatment gases are passed, are also effective.

The vapor phase operation should, of course, comprise at least one hydrogen fluoride, and one hydrogen, treatment. It has been found, though, that uranium recovery is somewhat more complete when the alternation ends with a hydrogen fluoride treatment. Similarly, hydrogen treatment appears to be more effective when it follows a hydrogen fluoride treatment. Applying these findings, the simplest alternation sequence for maximum uranium recovery comprises the succession of treatments with: HF, then $H_2$, then finally HF. Nevertheless, the recoveries attainable are only slightly lower upon application of a sequence comprising only a single treatment with each gas, in either order.

Concerning the duration of vapor treatments, ordinarily the hydrogen fluoride initially produces a vigorous, exothermic reaction, which proceeds for only a short time, usually not more than 15 minutes; such rapid reaction is normally attended with considerable loss of weight of the residue, and volatile fluorides, such as silicon tetrafluoride, are noted to be evolved. Thereafter, the HF reaction becomes much slower, with much smaller progressive weight loss and discontinued fluoride evolution. The reaction with hydrogen is also exothermic, but tends to be rather slow in reaction rate. To achieve maximum effectiveness in promoting uranium recovery, the alternated vapor-phase treatment should be continued until completion of reaction is indicated by cessation of further change of weight of the residue. This is most simply effected by continuing each treatment in the series until no further change in weight is noted. Applying, in this manner, the aforementioned three-step alternation to residue of composition as in Table 1, has been found to require three hours for full completion of the first HF treatment, four hours for completion of the intermediate $H_2$ treatment, and again three hours for the final HF treatment. However, further investigation has revealed that treatment of the residue by either of the two gaseous reactants is markedly accelerated when it follows a prior treatment of the residue with the other gas. For example, while hydrogen reacts with fresh residue very slowly, it proceeds quite rapidly when it follows a prior HF treatment. HF likely renders the residue more porous and/or converts various components therein to a form more susceptible to reaction with hydrogen. Likewise, HF engages in a considerably faster reaction when it follows $H_2$ treatment. As a result, total alternate gaseous treatment time is reduced by employing a multiplicity of short, choppy alternations between HF and $H_2$, rather than continuing each gaseous reaction to completion before commencing the next treatment. For example, it has been found that by employing short, 20 minute alternations, the same maximum weight loss is obtained in 1¾ hours, as otherwise requires 10 hours using 3 to 4 hour alternations. In this connection, though, it is ordinarily preferable that the vapor treatments, even though short, be conducted in consecutive alternation, rather than simultaneously; generally, mixing the treatment gases has been noted to seriously impair overall uranium recovery efficiency. Nevertheless, alternation of treatment with one gas with treatment with both simultaneously—for example, HF, followed by mixed HF+$H_2$—has been found effective.

In large-scale production application it has proven most practical, in effecting the vapor-phase reaction, to compress the residue in small pellets and to thereupon pass the gases, in rapid flow, upward through heated vertical beds of the pellets. Most finely-divided residues are readily pelletized by moistening with about 10 to 20% water, and then compressing into discs of ca. 1 inch diameter and about ⅛ inch to ½ inch thickness. The pellets may, for instance, be disposed as a bed of 8 to 16 inch depth, on a ⅛ inch mesh nickel grate, disposed in a length of 4 inch Monel pipe surrounded by a vertical tube furnace. Upon flowing HF or $H_2$ vertically upward through the bed, normally no more than an hour is required for the first treatment reaction to penetrate fully to the center of the pellets, with much less time being required in subsequent alternated treatments.

Following the alternating vapor treatment, the residue is leached to recover the uranium values therein. Solutions of strong inorganic acids suitable for leaching in accordance with the present invention are subject to wide variation. Among the mineral acids, nitric acid in aqueous solution, especially in 1:1 acid-water weight ratio, is particularly preferred. It has further been found that the incorporation of aluminum ions in the leaching acid tends to substantially enhance liberation and dissolution of uranium values. The aluminum ions serve to complex fluoride ions, thereby promoting dissolution of those various residue components, as well as desired uranium values, which have been converted to fluorides by the vapor-phase HF treatment. When employed in conjunction with aqueous $HNO_3$ as the leaching acid, the preferred source of aluminum ion is dissolved aluminum nitrate; optimum compositions approximate 1:1 $HNO_3$ containing about 15% (by weight) $Al(NO_3)_3$. Heating, and preferably boiling, the acid throughout leaching is further beneficial in promoting maximum uranium recovery. A series of leaches—normally 3 are enough—of about 1 hour each, appears to be the optimum leaching procedure; ordinarily aluminum ions need be employed in only the first one or two leaches, with simple aqueous nitric acid being satisfactory for the remainder. Eminently effective, as the leaching sequence, is a first leach with 1:1 $HNO_3$, ca. 15% in $Al(NO_3)_3$, a second leach with 1:1 $HNO_3$, ca. 5-10% in $Al(NO_3)_3$, and a third leach with 1:1 $HNO_3$.

Recovered uranium values may be removed and concentrated from the combined leaching acids, if desired, by various conventional techniques. Solvent extraction of uranium with a suitable organic solvent for uranium ions, such as diethylene glycol dibutyl ether, is satisfactory. In general, before solvent extraction, a pretreatment to moderate the rather high acidity of the leaching acid should first be applied—either neutralization with lime, or evaporating off much of the excess $HNO_3$ and then diluting the remaining solution, is satisfactory. Three extractions with one-half volumes of the ether are normally sufficient for approaching quantitative uranium removal rather closely. Thereafter, uranium values may be quantitatively stripped from the ether with water, say by employing three or four one-half volume water washes. Further concentration of the stripped uranium may then be effected by adding $NH_4OH$ to precipitate ammonium diuranate, which may then be ignited to $U_3O_8$.

Further illustration of the quantitative aspects and preferred conditions and precedures of the present method is provided in the following specific examples. Example 1 demonstrates generally the improvement afforded by the present method for recovering uranium values from difficultly-soluble residues, as compared with conventional leaching with mineral acids.

EXAMPLE 1

A large batch of accumulated residue, of derivation and composition substantially the same as that defined in Table 1, supra, was obtained. This material, upon its removal from uranium plant processing solutions by filtration, had been given three nitric acid leachings, dried and stored. Chemical analysis of the batch gave 0.28% U. As a first set of runs, equal samples of the dried residue were given successive simple leaches with various leaching solutions, including concentrated $HNO_3$, dilute $HNO_3$, concentrated HCl, $Al(NO_3)_3$ solutions, and boiling water. As a second set of runs, another group of equal samples were separately treated, in accordance with the present invention, to alternate vapor phase treatment with HF, and with $H_2$, in various sequence, all at 600° C., followed by two $Al(NO_3)_3$—1:1 $HNO_3$ leaches, and one 1:1 $HNO_3$ leach. In more detail, the vapor phase treatments were effected by disposing each sample in a carbon boat, which was placed in a horizontal nickel tube, 2 inch diameter x 29 inch length x 3/8 inch thickness, running horizontally through a multiple unit electric furnace. An atmosphere of nitrogen was maintained in the tube while the sample was brought up to temperature, after which reactant gases, in alternating sequence as specified, were continuously passed through the tube. Thereafter, the treated residue was removed from the boat to a glass vessel, and leached in the following manner.

First leach:
   120 gm. $Al(NO_3)_3 \cdot 9H_2O$ were added, then 120 ml. $H_2O$, and thereafter 120 ml. $HNO_3$ (slowly at first); the system was boiled one hour, diluted with 200 ml. $2NHNO_3$, boiled 1/4 hour longer, and then centrifuged.

Second leach:
   The remaining residue was boiled with 50 gm. $Al(NO_3)_3 \cdot 9H_2O$ dissolved in 200 ml. 1:1 $HNO_3$ for 1 hour, and then centrifuged.

Third leach:
   The remaining residue was boiled for one hour with 200 ml. 1:1 $HNO_3$, and then filtered.

Analyses were made to determine percentage of uranium recovered in each case; the various treatments are outlined, and the results of analyses are tabulated, in Table 2 below.

TABLE 2

*Recovery of uranium values from residues*

SIMPLE LEACHING

| Run No. | Sample Weight (gm.) | Uranium Analysis (percent) | Treatment | Product Weight (gm.) | Uranium Not Removed (percent) |
|---|---|---|---|---|---|
| A-1 | 50 | 0.28 | 1st. conc. $HNO_3$ leach (1 hr.) | 29.5 | 25.2 |
|  |  |  | 2nd. conc. $HNO_3$ leach (1 hr.) | 25.6 | 20.9 |
|  |  |  | 3rd. conc. $HNO_3$ leach (1 hr.) | 24.8 | 17.4 |
|  |  |  | 4th. conc. $HNO_3$ leach (1 hr.) | 24.0 | 18.0 |
| A-2 | 50 | 0.28 | 1st. 1:1 $HNO_3$ leach (1 hr.) | 34.0 | 27.1 |
|  |  |  | 2nd. 1:1 $HNO_3$ leach (1 hr.) | 25.7 | 20.0 |
|  |  |  | 3rd. 1:1 $HNO_3$ leach (1 hr.) | 25.1 | 19.5 |
| A-3 | 50 | 0.28 | 1st. conc. HCl leach (1 hr.) | 37.8 | 21.5 |
|  |  |  | 2nd. conc. HCl leach (1 hr.) | 32.3 | 16.0 |
|  |  |  | 3rd. conc. HCl leach (1 hr.) | 29.0 | 14.2 |
| A-4 | 50 | 0.28 | $Al(NO_3)_3 \cdot 9H_2O + 10\% H_2O$ (1 hr.) | 33.6 | 30.0 |
| A-5 | 50 | 0.28 | Boiled 1 1/4 hr. in $H_2O$ | 46.7 | 100.0 |

PRESENT PROCESS

| Run No. | Sample Weight (gm.) | Uranium Analysis (percent) | Treatment | Product Weight (gm.) | Uranium Not Removed (percent) |
|---|---|---|---|---|---|
| B-1 | 100 | 0.28 | Vapor phase: (a) HF, 4 hrs. at 600° C (b) $H_2$, 4 hrs. at 600° C | 43.7 | — |
|  |  |  | Leaching treated residue: 1st. $Al(NO_3)_3$-1:1 $HNO_3$ leach boiled; 1 1/4 hrs. 2nd. $Al(NO_3)_3$-1:1 $HNO_3$ leach boiled; 1 hr. 3rd. 1:1 $HNO_3$ leached boiled; 1 hr. | 6.5 | 0.4 |
| B-2 | 100 | 0.28 | Vapor phase: $H_2$, 4 hrs. at 600° C HF, 4 hrs. at 600° C | 44.7 | — |
|  |  |  | Leaching: (Same as in B-1) | 2.5 | 0.6 |
| B-3 | 100 | 0.28 | Vapor phase: HF, 3 hrs. at 600° C $H_2$, 4 hrs. at 600° C HF, 3 hrs. at 600° C | 42.8 | — |
|  |  |  | Leaching: (Same as in B-1) | 3.0 | 0.2 |

The efficacy of the present process in affording virtually quantitative uranium recovery, and the improvement afforded over conventional leaching operations alone, is clearly evidenced by the results set forth in Table 2. The preferability of employing the particular vapor-treatment sequence, HF—$H_2$—HF, is also apparent. The effectiveness of the particular leach treatment employed after the vapor treatment is further investigated in the following Example 2.

EXAMPLE 2

The procedure of run B-3 of Example 1 was repeated separately upon each of several equal samples of residue from the same batch source as in Example 1, with the exception that different leach treatments were applied in each case. The vapor-treated residues were given different amounts of leaching, employing one or more of the individual leaching steps of run B-3, as indicated. Results are presented in Table 3 below.

TABLE 3

*Effect of variation in leaching*

| Run No. | Sample weight (gm.) | Uranium analysis (percent) | Treatment | Product weight (gm.) | Uranium not removed (percent) |
|---|---|---|---|---|---|
| | | | Vapor phase:<br>  HF, 3 hrs. at 600° C.<br>  $H_2$, 4 hrs. at 600° C.<br>  HF, 3 hrs. at 600° C.<br>Leaching: | | |
| C-1 | 100 | 0.28 | (a) $Al(NO_3)_3$—1:1 $HNO_3$, boiled 1 hr., diluted, boiled ¼ hr. | 14.0 | 8.6 |
| C-2 | 100 | 0.28 | (a) $Al(NO_3)_3$—1:1 $HNO_3$ boiled 1 hr., diluted, boiled ¼ hr.<br>(b) 1:1 $HNO_3$, boiled 1 hr. | 3.8 | 2.1 |
| C-3 | 100 | 0.28 | (a) $Al(NO_3)_3$—1:1 $HNO_3$ boiled 1 hr., diluted, boiled ¼ hr.<br>(b) Second $Al(NO_3)_3$—1:1 $HNO_3$ leach (as above)<br>(c) 1:1 $HNO_3$, boiled 1 hr. | 3.0 | 0.2 |

The results in Table 3 illustrate the preferability of leaching the vapor-treated residue with a pair of one-hour $Al(NO_3)_3$—1:1 $HNO_3$ boiling leaches, followed by a simple, boiling, aqueous nitric acid leach. In Example 3, following, application of the present method to a larger quantity, and different-type, of residue, as well as organic solvent extraction of the uranium from the leaching acid, followed by stripping with water, ammonium diuranate precipitation, and ignition to $U_3O_8$, are demonstrated.

EXAMPLE 3

*Run X.*—500 grams of dried residue, obtained from the same batch source as in Example 1, was treated by the procedure outlined for Example 1, run B-3, but employing proportionately greater quantities of leaching acids. Thereafter, combined filtrates from the leaching procedure, totaling 1500 ml., were evaporated until the boiling temperature of the acid solution reached 135° C., and were thereupon diluted with an equal volume of water. A small amount of precipitate had formed and was filtered off and washed; radiometric determination indicated the precipitate contained 0.66% of the total uranium present. The volume of the filtrate was 975 ml., and had a density of 1.45, and pH of 0.3. The solution was equilibrated three times, in succession, each time with one-half its volume of fresh diethylene glycol dibutyl ether, by means of shaking in a separatory funnel, permitting phase stratification, and draining the aqueous phase away from the organic. The separated ether phases were combined, and were washed four times, in succession, each time with a volume of water one-half that of the ether phase, applying conventional separatory-funnel procedure. A fifth water-wash was effected and tested qualitatively, but showed no trace of further uranium in the ether phase. Uranium was then precipitated from the combined first four water washings by adding ammonium hydroxide thereto until no further precipitate appeared; the precipitate was removed by filtration and ignited to $U_3O_8$.

*Run Y.*—A batch of uranium-bearing residue, accumulated at a different point in a uranium processing plant, and having a composition somewhat different from that defined in Table 1, was obtained. This material originally had an initial dry weight of about 68,000 grams, and had been given four one-hour leaches with boiling concentrated nitric acid. This treatment had resulted in a residue of about 4,500 grams dried weight, containing 0.6% uranium by chemical analysis. A sample of this material was subjected to much the same treatment as outlined in run X above.

Results of these runs, as well as spectrographic analyses of both residues, before and after treatment, are set forth in Tables 4 and 5 below.

TABLE 4

*Results with varying sample size and composition*

| Run No. | Sample weight (gm.) | Uranium analysis (percent) | Treatment | Product weight (gm.) | Uranium removed (percent) | Uranium extracted (gm.) |
|---|---|---|---|---|---|---|
| X | 500 | 0.28 | Vapor phase:<br>  HF, 7 hrs. at 650° C.<br>  $H_2$, 4½ hrs. at 750° C.<br>  HF, 2½ hrs. at 750° C.<br>Leaching:<br>  (a) $Al(NO_3)_3$—1:1 $HNO_3$; 2 hrs.<br>  (b) $Al(NO_3)_3$—1:1 $HNO_3$; 1½ hrs.<br>  (c) 1:1 $HNO_3$, 1 hr. | 310<br>230<br><br>52 | 98.5 | 1.44 |
| Y | 100 | 0.6 | Vapor phase:<br>  HF 3 hrs. at 600° C.<br>  $H_2$, 4 hrs. at 600° C.<br>  HF, 3 hrs. at 600° C.<br>Leaching: (Same as in Run X) | 74.5<br><br>34.5 | 98.9 | 0.596 |

TABLE 5

*Spectrographic analyses of residues*

| Run No. | Material | Elements (percent) | | | | | | | | | | | | | | | |
|---|---|---|---|---|---|---|---|---|---|---|---|---|---|---|---|---|---|
| | | Si | Ca | Sn | Fe | Cr | Al | Cu | Ag | Ni | Ti | Zn | Mn | Mg | Pb | Mo | Nb |
| X | Sample | 15.0 | 10.0 | 5.0 | 2.5 | 2.5 | 2.0 | 1.5 | 1.0 | 1.0 | 1.0 | 0.6 | 0.3 | 0.3 | 0.3 | 0.1 | |
| | Product | 0.45 | 2.5 | 10 | 10 | 7.5 | 10 | .04 | 0.3 | .1 | 2.5 | .6 | 0.1 | 0.3 | .3 | 0.1 | 0.5 |
| Y | Sample | 2.0 | 0.3 | 10 | 10 | 10 | | .75 | .75 | 2.5 | 1.5 | 1.0 | .6 | 0.3 | .3 | 1.25 | 0.6 |
| | Product: | | | | | | | | | | | | | | | | |
| | (a) before leaching | 0.1 | 0.3 | 2.5 | 10 | 10 | .75 | 0.6 | 2.5 | 1.5 | .15 | .6 | 0.3 | 0.3 | .3 | .1 | 0.3 |
| | (b) after leaching | .01 | .04 | 10 | 2.5 | 10 | 1.5 | 0.04 | .08 | .1 | 0.3 | .6 | .1 | .04 | .3 | 0.3 | 2.0 |

The exact nature of all of the reactions and mechanisms contributing to the substantially quantitative uranium recovery afforded by the present process is not fully known. However, analytical study of the reactions reveals that in the vapor-phase HF treatment, some of the insoluble residue materials, are, to various extents, converted to fluorides. Much of the silica present is converted to $SiF_4$, which, being volatile, passes away with the treatment gas stream. Similar action likely decomposes any silicates present. Sulfates, e.g. $CaSO_4$, also seem to be largely converted to fluorides, with $H_2SO_4$ passing off as vapor. Limited conversion of iron and copper compounds to fluorides appears to obtain also. Upon treatment with hydrogen gas, some of the unconverted metal compounds remaining, notably $SnO_2$, apparently some amounts of silver, copper, and iron compounds, and likely some of the converted fluorides as well, are evidently reduced to free metal. Upon a repeated treatment with HF, some of the resulting free metals, and remaining amounts of oxide compounds and the like, are converted to fluorides. Likely, much of the uranium is converted to uranium (IV) fluoride through the same reactions. Upon leaching, those compounds converted to fluorides are observed to be mostly acid soluble and dissolve. It is believed that all of these effects mutually contribute—through removal of certain residue components by vaporization, removal of others by solubilization and dissolution, and by changing physical and chemical constitution of other components so as to cause expansion or contraction—to remove part of the residue and render the remainder exceptionally porous, so as to accomplish the virtually complete liberation of the uranium values from the indiscriminate conglomeration of materials in the residue, and render them fully accessible to the leaching acids.

While this invention has been described with particular reference to its application to the processing of apparatus corrosion products, deposited from uranium processing solutions and bearing uranium values therein, it is of inherently much wider applicability. The present process is well adapted to improved recovery of uranium unleachably occluded in virtually any difficultly-soluble metal oxide, sulfate or silicate material, regardless of its source or derivation. A typical application, for example, is in the recovery of uranium values from ores. Another application, of particular current importance, is in the recovery of uranium oxide from spent ceramic fuel elements of high temperature nuclear reactors; these normally comprise refractory compositions of thermally-stable metal oxides, containing uranium oxide dispersed and bound therein as the nuclear fuel. The uranium content of such fuel elements must be periodically isolated and processed; in such recovery, after initial comminution of the oxide elements, the present process has direct application. Various additional applications will become apparent to those skilled in the art. It is therefore to be understood that all matters contained in the above descripion and examples are illustrative only and do not limit the scope of the present invention.

What is claimed is:

1. In a process for the recovery of uranium values, soluble in a strong mineral acid and contained and bound in compound form within a comminuted solid residue comprised predominantly of at least one material selected from the group consisting of inorganic oxides, sulfates, and silicates, comprising leaching such residue with said strong mineral acid in which leaching at most only part of the uranium values are recovered, the improvement step for substantially increasing the degree of completeness of dissolution and recovery of the uranium values from the residue by the leaching, which comprises subjecting said residue, prior to said leaching, to the actions, in consecutive alternation, of gaseous hydrogen fluoride, and of gaseous hydrogen, thereby liberating uranium values therein.

2. The process of claim 1 wherein said subjecting of residue to the actions of gaseous reagents is effected at a temperature maintained within the approximate range of 500° to 700° C.

3. In a process for the recovery of uranium values, soluble in a strong mineral acid and contained and bound in compound form within a comminuted solid residue comprised predominantly of at least one material selected from the group consisting of inorganic oxides, sulfates, and silicates, comprising leaching such residue with said strong mineral acid in which leaching at most only part of the uranium values are recovered, the improvement step for substantially increasing the degree of completeness of dissolution and recovery of the uranium values from the residue by the leaching, which comprises, prior to said leaching, subjecting said residue to the action of gaseous hydrogen fluoride, and then of gaseous hydrogen, and again of gaseous hydrogen fluoride, while maintaining the temperature of the system within the approximate range of 500° to 700° C., thereby liberating uranium values therein.

4. In a process for the recovery of uranium values, soluble in a strong mineral acid and contained and bound in compound form within a comminuted solid residue comprised predominantly of at least one material selected from the group consisting of inorganic oxides, sulfates, and silicates, comprising leaching such residue with said strong mineral acid in which leaching at most only part of the uranium values are recovered, the improvement step for substantially increasing the degree of completeness of dissolution and recovery of the uranium values from the residue by the leaching, which comprises subjecting said residue, prior to said leaching, to the actions of gaseous hydrogen fluoride for approximately three hours, and then of gaseous hydrogen for approximately four hours, and then again of gaseous hydrogen fluoride for approximately three hours, while maintaining the temperature of the system substantially within the range of 500° to 700° C., thereby liberating uranium values therein.

5. In a process for the recovery of uranium values, soluble in a strong mineral acid and contained and bound in compound form within a comminuted solid residue comprised predominantly of at least one material selected from the group consisting of inorganic oxides, sulfates, and silicates, comprising leaching such residue with said strong mineral acid in which leaching at most only part of the uranium values are recovered, the improvement step for substantially increasing the degree of completeness of dissolution and recovery of uranium values from the residue by the leaching, which comprises, prior to said leaching, pelletizing said comminuted residue by admixture with about 10–20% water and compression, then disposing the pellets so formed as a bed, thereupon subjecting said residue to the action, in consecutive alternation, of gaseous hydrogen fluoride, and of gaseous hydrogen, flowed upwardly through said bed, thereby liberating uranium values therein.

6. In a process for the recovery of uranium values, soluble in a strong mineral acid and contained and bound in compound form within a comminuted solid residue comprised predominantly of at least one material selected from the group consisting of inorganic oxides, sulfates, and silicates, comprising leaching such residue with said strong mineral acid in which leaching at most only part of the uranium values are recovered, the improvement operation for substantially increasing the degree of completeness of dissolution and recovery of the uranium values from the residue by the leaching, which comprises subjecting said residue, prior to said leaching, to the actions, in consecutive alternation, of gaseous hydrogen fluoride, and of gaseous hydrogen, and thereupon effecting said leaching employing aqueous nitric acid as said strong mineral acid.

7. In a process for the recovery of uranium values from a comminuted solid residue comprised predominantly of at least one material selected from the group consisting of inorganic oxides, sulfates, and silicates, and containing uranium halide bound therewithin, comprising leaching such residue with a strong mineral acid in which leading at most only part of the uranium values are recovered, the improvement operation for substantially increasing the degree of completeness of dissolution and recovery of the uranium values from the residue by the leaching, which comprises subjecting said residue, prior to said leaching, to the actions, in consecutive alternation, of gaseous hydrogen fluoride, and of gaseous hydrogen, and thereupon effecting said leaching employing aqueous nitric acid as said strong mineral acid.

8. In a process for the recovery of uranium values from a comminuted solid residue comprised predominantly of at least one material selected from the group consisting of inorganic oxides, sulfates, and silicates, containing uranous chloride bound therewithin, comprising leaching such residue with a strong mineral acid in which leaching at most only part of the uranium values are recovered, the improvement operation for substantially increasing the degree of completeness of dissolution and recovery of the uranium values from the residue, prior to said leaching, to the actions, in consecutive alternation, of gaseous hydrogen fluoride, and of gaseous hydrogen, and thereupon effecting said leaching employing aqueous nitric acid as said strong mineral acid.

9. In a process for the recovery of uranium values, soluble in a strong mineral acid and contained and bound in compound form within a comminuted solid residue comprised predominantly of at least one material selected from the group consisting of inorganic oxides, sulfates, and silicates, comprising leaching such residue with said strong mineral acid in which leaching at most only part of the uranium values are recovered, the improvement operation for substantially increasing the degree of completeness of dissolution and recovery of uranium values from the residue by the leaching, which comprises, prior to said leaching, subjecting such residue to the actions, in consecutive alternation, of gaseous hydrogen fluoride, and of gaseous hydrogen, and thereupon effecting said leaching employing strong mineral acid having aluminum ions dissolved therein, thereby dissolving uranium values from the residue.

10. The process of claim 9 wherein said strong mineral is aqueous nitric acid, and said aluminum ions are provided by aluminum nitrate dissolved therein.

11. In a process for the recovery of uranium values, soluble in a strong mineral acid and contained and bound in compound form within a comminuted solid residue comprised predominantly of at least one material selected from the group consisting of inorganic oxides, sulfates, and silicates, comprising leaching such residue with said strong mineral acid in which leaching at most only part of the uranium values are recovered, the improvement step for substantially increasing the degree of completeness of dissolution and recovery of the uranium values from the residue by the leaching, which comprises subjecting said residue, prior to said leaching, to the actions, in consecutive alternation, of gaseous hydrogen fluoride, and of gaseous hydrogen, thereby liberating uranium values therein, and thereupon effecting said leaching by boiling the so treated residue for about one hour with aqueous nitric acid having approximately 15% aluminum nitrate dissolved therein, separating the remaining residue and further boiling it for about one hour with aqueous nitric acid having approximately 5–10% aluminum nitrate dissolved therein, and thereafter again separating the remaining residue and boiling it for approximately one hour in aqueous nitric acid, thereby dissolving uranium values therefrom.

12. In a process for the recovery of uranium values, soluble in a strong mineral acid and contained and bound in compound within a comminuted solid residue comprised predominantly of at least one material selected from the group consisting of inorganic oxides, sulfates, and silicates of an element selected from the group consisting of calcium, iron, copper, tin, and silver, comprising leaching said residue with said strong mineral acid in which leaching at most only part of the uranium values are recovered, the improvement operation for substantially increasing the degree of completeness of dissolution and recovery of the uranium values from the residue by the leaching, which comprises, prior to said leaching, subjecting said residue to the actions of gaseous hydrogen fluoride for approximately three hours, and then of gaseous hydrogen for approximately four hours, and then again a gaseous hydrogen fluoride for approximately three hours, while maintaining the temperature of the system at substantially 600° C., thereby liberating uranium values therein, and thereupon effecting said leaching by boiling the so treated residue for about one hour with aqueous nitric acid having approximately 15% aluminum nitrate dissolved therein, separating the remaining residue and further boiling it for about one hour with aqueous nitric acid having approximately 5–10% aluminum nitrate dissolved therein, and thereafter again separating the remaining residue and boiling it for approximately one hour in aqueous nitric acid, thereby dissolving uranium values therefrom.

13. In a process for the recovery of uranium values, soluble in a strong mineral acid and contained and bound in compound form within a comminuted solid residue comprised predominantly of at least one material selected from the group consisting of inorganic oxides, sulfates, and silicates, comprising leaching such residue with said strong mineral acid in which leaching at most only part of the uranium values are recovered, the improvement step for substantially increasing the degree of completeness of dissolution and recovery of the uranium values from the residue by the leaching, which comprises subjecting said residue, prior to said leaching, to the actions, in consecutive alternation, of gaseous hydrogen fluoride, and of gaseous hydrogen, thereby liberating uranium values therein, thereupon effecting said leaching of the so treated residue employing aqueous nitric acid as said strong mineral acid, thereby dissolving uranium values from the residue, subsequently recovering leached uranium values from said aqueous nitric acid by solvent extraction with diethylene glycol dibutyl ether, and thereafter stripping the extracted uranium values from the ether with water.

References Cited in the file of this patent

UNITED STATES PATENTS

| | | |
|---|---|---|
| 2,227,833 | Hixson et al. | Jan. 7, 1941 |
| 2,534,677 | Newton et al. | Dec. 19, 1950 |